(12) United States Patent
Nakajima et al.

(10) Patent No.: US 9,614,241 B2
(45) Date of Patent: Apr. 4, 2017

(54) HYDROGEN-PURIFICATION APPARATUS AND FUEL-CELL SYSTEM USING SAME

(75) Inventors: Tomoyuki Nakajima, Hyogo (JP); Hidenobu Wakita, Kyoto (JP); Seiji Fujihara, Osaka (JP); Yukimune Kani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 638 days.

(21) Appl. No.: 13/503,606

(22) PCT Filed: Aug. 24, 2011

(86) PCT No.: PCT/JP2011/004690
§ 371 (c)(1),
(2), (4) Date: Apr. 23, 2012

(87) PCT Pub. No.: WO2012/026116
PCT Pub. Date: Mar. 1, 2012

(65) Prior Publication Data
US 2012/0219870 A1    Aug. 30, 2012

(30) Foreign Application Priority Data
Aug. 25, 2010    (JP) .................. 2010-188195

(51) Int. Cl.
*H01M 8/0662* (2016.01)
*C01B 3/38* (2006.01)
*C01B 3/48* (2006.01)
*C01B 3/58* (2006.01)
(Continued)

(52) U.S. Cl.
CPC ............ *H01M 8/0662* (2013.01); *C01B 3/38* (2013.01); *C01B 3/48* (2013.01); *C01B 3/58* (2013.01); *C01B 3/586* (2013.01); *C01B 2203/0233* (2013.01); *C01B 2203/0283* (2013.01); *C01B 2203/0445* (2013.01); *C01B 2203/066*
(Continued)

(58) Field of Classification Search
CPC ...... H01M 8/0668; H01M 8/0662; C01B 3/38; C01B 3/48; C01B 3/58; C01B 3/356;
(Continued)

(56) References Cited

U.S. PATENT DOCUMENTS

2002/0150799 A1    10/2002    Baumann et al.
2004/0126288 A1    7/2004    Fuju et al.
(Continued)

FOREIGN PATENT DOCUMENTS

EP        2172420 A1    4/2010
JP    2000-256003 A    9/2000
(Continued)

OTHER PUBLICATIONS

English Translation of JP 2010-001187 A.*
(Continued)

*Primary Examiner* — Milton I Cano
*Assistant Examiner* — Philip A Stuckey
(74) *Attorney, Agent, or Firm* — McDermott Will & Emery LLP (57) ABSTRACT

A hydrogen purifier (100) includes: a shift conversion catalyst (5a) which reduces, through a shift reaction, carbon monoxide contained in a hydrogen-containing gas; and a methanation catalyst (6a) which reduces, through a methanation reaction, carbon monoxide contained in the hydrogen-containing gas that has passed through the shift conversion catalyst (5a). The shift conversion catalyst (5a) and the methanation catalyst (6a) are heat exchangeable with each other via a first partition wall (8), and a flow direction of the hydrogen-containing gas that passes through the shift conversion catalyst (5a) is opposite to a flow direction of the hydrogen-containing gas that passes through the methanation catalyst (6a).

7 Claims, 11 Drawing Sheets

(52) U.S. Cl.
CPC ......... (2013.01); *C01B 2203/0833* (2013.01); *C01B 2203/0838* (2013.01); *C01B 2203/1076* (2013.01); *C01B 2203/1088* (2013.01); *C01B 2203/16* (2013.01); *Y02E 60/50* (2013.01)

(58) Field of Classification Search
CPC .... C01B 2203/0233; C01B 2203/0283; C01B 2203/0445; C01B 2203/066; C01B 2203/0833; C01B 2203/0838; C01B 2203/1076; C01B 2203/1088; C01B 2203/16; Y02E 60/50
USPC .............................. 429/411, 412, 420; 48/61
See application file for complete search history.

(56) References Cited

U.S. PATENT DOCUMENTS

| | | | | |
|---|---|---|---|---|
| 2005/0025701 | A1* | 2/2005 | Bhat | B01J 23/63 423/652 |
| 2007/0172401 | A1 | 7/2007 | Wanninger et al. | |
| 2010/0183928 | A1* | 7/2010 | Fujihara et al. | 429/423 |

FOREIGN PATENT DOCUMENTS

| | | |
|---|---|---|
| JP | 2004-059415 A | 2/2004 |
| JP | 2005-174860 A | 6/2005 |
| JP | 2007-055868 A | 3/2007 |
| JP | 2008-303128 A | 12/2008 |
| JP | 2010-001187 A | 1/2010 |
| JP | 2010-100494 A | 5/2010 |
| WO | WO 2009011098 A1 * | 1/2009 |

OTHER PUBLICATIONS

International Search Report issued in International Patent Application No. PCT/JP2011/004690, dated Dec. 6, 2011.
Extended European Search Report issued in corresponding European Application No. 11819592.4, dated Jan. 31, 2014.

* cited by examiner

HYDROGEN-PURIFICATION APPARATUS AND FUEL-CELL SYSTEM USING SAME

RELATED APPLICATIONS

This application is the U.S. National Phase under 35 U.S.C. §371 of International Application No. PCT/JP2011/004690, filed on Aug. 24, 2011, which in turn claims the benefit of Japanese Application No. 2010-188195, filed on Aug. 25, 2010, the disclosures of which Applications are incorporated by reference herein.

TECHNICAL FIELD

The present invention relates to a hydrogen purifier configured to reduce carbon monoxide (hereinafter, referred to as CO) contained in a hydrogen-containing gas, and to a fuel cell system including a fuel cell configured to generate electric power by using the hydrogen-containing gas that has passed through the hydrogen purifier.

BACKGROUND ART

Hydrogen purifiers include a CO remover which reduces carbon monoxide in a hydrogen-containing gas generated through a reforming reaction. The hydrogen-containing gas is generated through the reforming reaction by using a raw material of which the constituent elements are at least carbon and hydrogen. The hydrogen-containing gas is, after passing through the hydrogen purifier, supplied to a fuel cell and used for electric power generation by the fuel cell.

The fuel cell may be any one of various types of fuel cells including a solid polymer fuel cell, a phosphoric-acid fuel cell, and a solid oxide fuel cell. Although in general the CO remover is configured to reduce carbon monoxide through an oxidation reaction, there are also proposed CO removers configured to reduce carbon monoxide through a methanation reaction (see Patent Literature 1 and Patent Literature 2, for example).

CITATION LIST

Patent Literature

PTL 1: Japanese Laid-Open Patent Application Publication No. 2000-256003
PTL 2: Japanese Laid-Open Patent Application Publication No. 2005-174860

SUMMARY OF INVENTION

Technical Problem

Although hydrogen purifiers disclosed in the above Patent Literatures take into consideration temperature control for suppressing $CO_2$ methanation, these Patent Literatures fail to address a problem that a temperature range for efficient CO reduction through a methanation reaction is limited. The problem is described below in more detail. Generally speaking, a temperature gradient occurs in a methanation catalyst between its upstream and downstream sides. For this reason, the temperature of a certain portion of the methanation catalyst deviates from the aforementioned temperature range. This results in reduced reactivity.

In view of the above problem regarding conventional hydrogen purifiers, an object of the present invention is to provide a hydrogen purifier, in which the temperature gradient between the upstream and downstream sides of the methanation catalyst is reduced and CO methanation reactivity is improved as compared to the conventional art, and to provide a fuel cell system including the hydrogen purifier.

Solution to Problem

In order to solve the above problem, a hydrogen purifier according to the present invention includes: a shift conversion catalyst which reduces, through a shift reaction, carbon monoxide contained in a hydrogen-containing gas; and a methanation catalyst which reduces, through a methanation reaction, carbon monoxide contained in the hydrogen-containing gas that has passed through the shift conversion catalyst. The shift conversion catalyst and the methanation catalyst are heat exchangeable with each other via a first partition wall. A flow direction of the hydrogen-containing gas that passes through the shift conversion catalyst is opposite to a flow direction of the hydrogen-containing gas that passes through the methanation catalyst.

A fuel cell system according to the present invention includes: the hydrogen purifier according to the present invention; and a fuel cell configured to generate electric power by using the hydrogen-containing gas that is supplied from the hydrogen purifier.

Advantageous Effects of Invention

According to the present invention, a temperature gradient between upstream and downstream sides of a methanation catalyst is reduced and CO methanation reactivity is improved as compared to conventional hydrogen purifiers and conventional fuel cell systems.

DESCRIPTION OF EMBODIMENTS

Hereinafter, a description is given of a hydrogen purifier according to embodiments of the present invention and a fuel cell system including the hydrogen purifier.

Embodiment 1

The hydrogen purifier according to Embodiment 1 includes: a shift conversion catalyst which reduces, through a shift reaction, carbon monoxide contained in a hydrogen-containing gas; and a methanation catalyst which reduces, through a methanation reaction, carbon monoxide contained in the hydrogen-containing gas that has passed through the shift conversion catalyst. The shift conversion catalyst and the methanation catalyst are heat exchangeable with each other via a first partition wall. A flow direction of the hydrogen-containing gas that passes through the shift conversion catalyst is opposite to a flow direction of the hydrogen-containing gas that passes through the methanation catalyst.

Figure 1A:
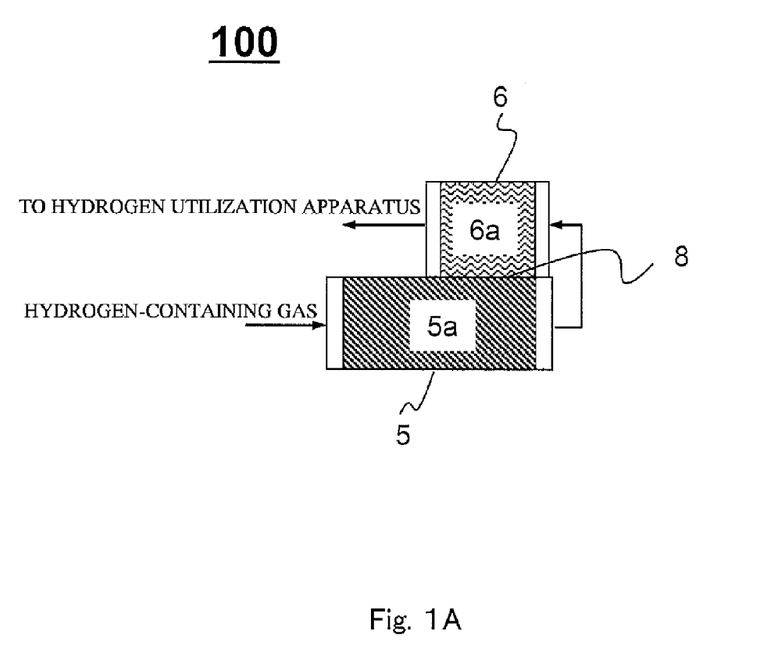
FIG. 1A shows a schematic configuration of a hydrogen purifier according to Embodiment 1.

FIG. 1A shows a schematic configuration of the hydrogen purifier according to Embodiment 1.

As shown in FIG. 1A, a hydrogen purifier 100 according to the present embodiment includes a shift converter 5 including a shift conversion catalyst 5a and a CO remover 6 including a methanation catalyst 6a. A first partition wall 8 is provided between the shift conversion catalyst 5a and the methanation catalyst 6a in such a manner as to allow the shift conversion catalyst 5a and the methanation catalyst 6a to exchange heat with each other via the first partition wall 8. The flow direction of a hydrogen-containing gas that passes through the shift conversion catalyst 5a is opposite to the flow direction of the hydrogen-containing gas that passes through the methanation catalyst.

Next, a conventional hydrogen purifier is described.

Figure 2:
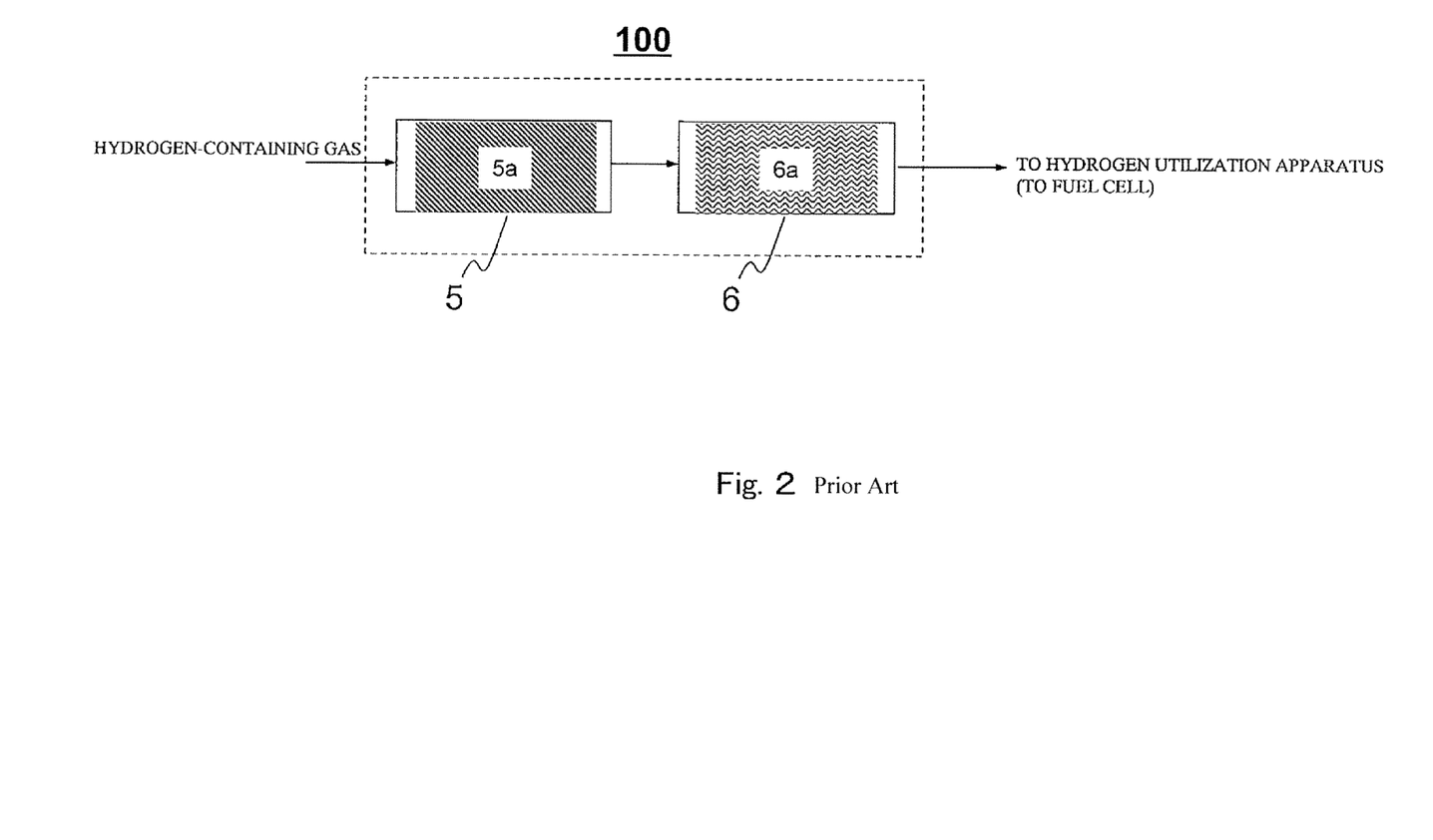
FIG. 2 is a schematic diagram showing a configuration of a hydrogen purifier representing a conventional example.

FIG. 2 is a schematic diagram showing a schematic configuration of a conventional hydrogen purifier 100.

As shown in FIG. 2, the conventional hydrogen purifier 100 includes a shift converter 5 including a shift conversion catalyst 5a and a CO remover 6 including a methanation catalyst 6a. The CO remover 6 is disposed downstream from the shift converter 5. The conventional hydrogen purifier 100 is not configured in such a manner as to allow the shift conversion catalyst 5a and the methanation catalyst 6a to transfer heat via a partition wall.

Here, for example, a noble metal catalyst such as Pt, a Cu—Zn based catalyst, or the like is used as a catalyst metal for forming the shift conversion catalyst 5a. Any support can be used as a support for the catalyst metal, so long as the support is capable of supporting the catalyst metal. Examples of the support include alumina, silica, silica alumina, magnesia, titania, and zeolite. A pellet, honeycomb, or the like is used as the base of the shift conversion catalyst 5a.

A metal that is active for CO methanation is used as a catalyst metal for the methanation catalyst 6a. Examples of the catalyst metal include metals such as Pt, Ru, Rh, Pd, and Ni. It is particularly preferred that the catalyst metal contains at least Ru, Rh, or Ni. Any support can be used as a support for the catalyst metal, so long as the support is capable of supporting the catalyst metal. Examples of the support include alumina, silica, silica alumina, magnesia, titania, and zeolite. A pellet, honeycomb, or the like is used as the base of the methanation catalyst 6a.

Generally speaking, temperatures suitable for CO reduction by means of the shift conversion catalyst 5a are higher than temperatures suitable for CO reduction by means of the methanation catalyst 6a. CO shift reaction progresses such that it occurs from the upstream side of the shift conversion catalyst 5a, and the amount of the reaction is greater at the upstream side of the shift conversion catalyst 5a than at the downstream side of the shift conversion catalyst 5a. Since the shift reaction is an exothermic reaction, the temperature at the upstream side of the shift conversion catalyst 5a becomes higher than the temperature at the downstream side of the shift conversion catalyst 5a. Such temperature distribution from the upstream side to the downstream side is similarly observed in the methanation catalyst.

As described above, the hydrogen purifier 100 according to the present embodiment is configured such that the shift conversion catalyst 5a and the methanation catalyst 6a transfer heat via the first partition wall 8, and such that the flow direction of the hydrogen-containing gas that passes through the shift conversion catalyst 5a is opposite to the flow direction of the hydrogen-containing gas that passes through the methanation catalyst.

Accordingly, the downstream side of the methanation catalyst 6a, the temperature of which becomes lower than that of the upstream side of the methanation catalyst 6a as described above, exchanges heat with a relatively high temperature portion of the shift conversion catalyst 5a. Therefore, a temperature gradient between the upstream and downstream sides of the methanation catalyst 6a is reduced as compared to the conventional hydrogen purifier 100.

Variation 1

Figure 1B:
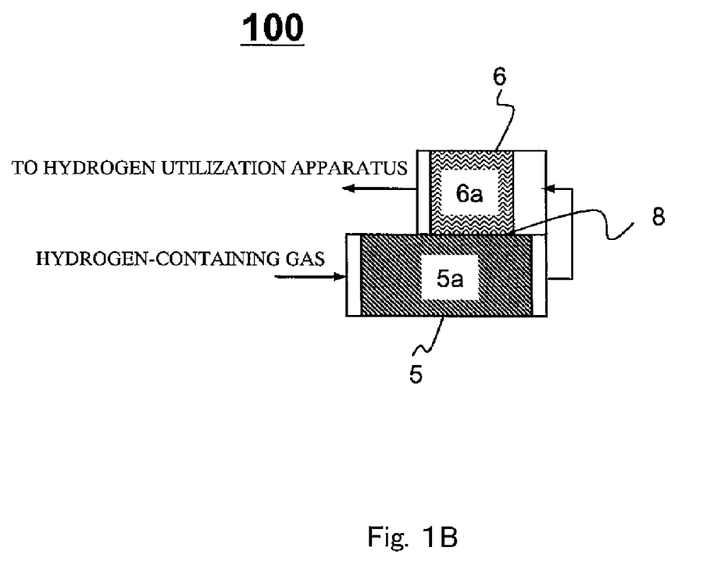
FIG. 1B shows a schematic configuration of a hydrogen purifier according to Variation 1 of Embodiment 1.

Referring to FIG. 1B, as Variation 1 of the hydrogen purifier 100 according to the present embodiment, the hydrogen purifier 100 may be configured such that the most downstream portion of the shift conversion catalyst 5a protrudes further than the most upstream portion of the methanation catalyst 6a.

According to the above configuration, the upstream portion of the methanation catalyst 6a exchanges heat with a portion, of the shift conversion catalyst 5a, that has a higher temperature than the most downstream portion of the shift conversion catalyst 5a. This reduces a possibility that the temperature of the methanation catalyst 6a becomes lower than a suitable temperature. Moreover, the most downstream portion of the shift conversion catalyst 5a does not exchange heat with the most upstream portion, i.e., a high temperature portion, of the methanation catalyst 6a. Therefore, in this case, the temperature at the most downstream portion of the shift conversion catalyst 5a can be reduced. Accordingly, carbon monoxide contained in the hydrogen-containing gas that has passed through the shift conversion catalyst 5a can be reduced.

Variation 2

Figure 1C:
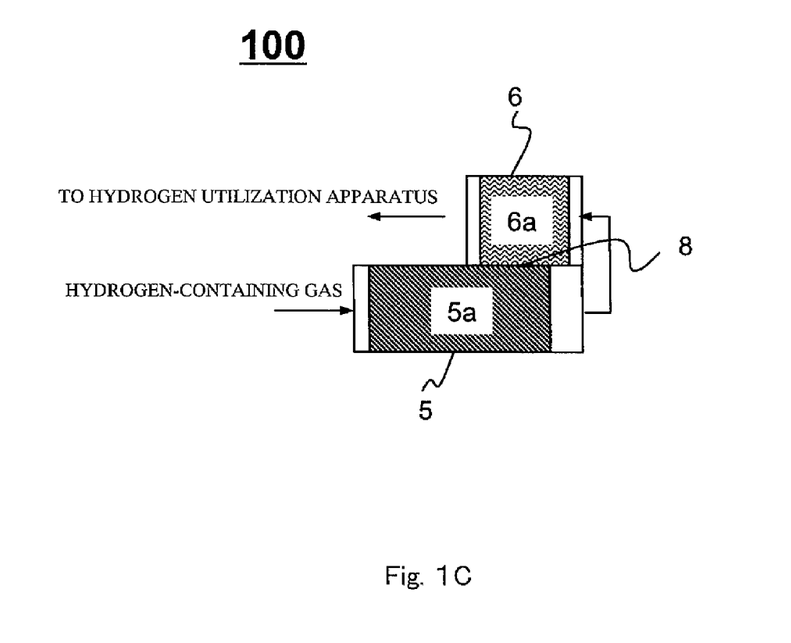
FIG. 1C shows a schematic configuration of a hydrogen purifier according to Variation 2 of Embodiment 1.

Referring to FIG. 1C, as Variation 2 of the hydrogen purifier 100 according to the present embodiment, the hydrogen purifier 100 may be configured such that the most upstream portion of the methanation catalyst 6a protrudes further than the most downstream portion of the shift conversion catalyst 5a.

According to the above configuration, the reaction heat of the methanation catalyst 6 is not taken away by the most downstream portion, i.e., the lowest temperature portion, of the shift conversion catalyst 5a. This reduces a possibility that the temperature of the methanation catalyst 6 becomes lower than a suitable temperature. Moreover, the most downstream portion of the shift conversion catalyst 5a does not exchange heat with the most upstream portion, i.e., a high temperature portion, of the methanation catalyst 6a. Therefore, in this case, the temperature at the most downstream portion of the shift conversion catalyst 5a can be reduced. Accordingly, carbon monoxide contained in the hydrogen-containing gas that has passed through the shift conversion catalyst 5a can be reduced.

Embodiment 2

Hereinafter, the hydrogen purifier 100 according to Embodiment 2 is described.

Figure 3:
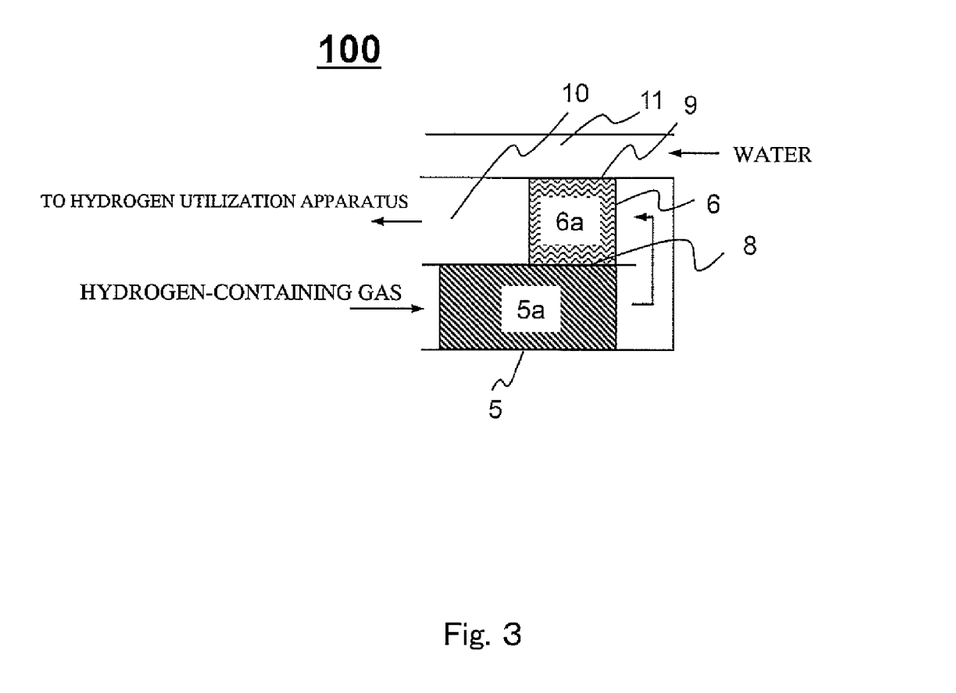
FIG. 3 shows a schematic configuration of a hydrogen purifier according to Embodiment 2.

FIG. 3 shows a schematic configuration of the hydrogen purifier according to the present embodiment.

As shown in FIG. 3, the hydrogen purifier 100 according to the present embodiment includes a water passage 11, and is configured in such a manner as to allow water flowing through the water passage 11 to exchange heat with the methanation catalyst 6a via a second partition wall 9. In other words, the water passage 11 and the shift conversion catalyst 5a are arranged such that the methanation catalyst 6a is interposed therebetween. Other than the above, the hydrogen purifier 100 according to Embodiment 2 is the same as the hydrogen purifier 100 according to Embodiment 1. Therefore, a description regarding the other features of the hydrogen purifier 100 according to Embodiment 2 is omitted below. It should be noted that the above-described configuration according to the present embodiment may be applied to at least one of the hydrogen purifier 100 according to Variation 1 and the hydrogen purifier 100 according to Variation 2.

According to the above configuration, in the hydrogen purifier 100 of the present embodiment, a possibility that the temperature of the shift conversion catalyst drops excessively to deviate from a suitable temperature range for the shift reaction is favorably reduced as compared to conventional hydrogen purifiers in which a shift conversion catalyst is cooled down in a direct manner, via a partition wall, by water flowing through a water passage. Meanwhile, in the hydrogen purifier 100 according to the present embodiment, the methanation catalyst is cooled down in a direct manner, via the partition wall, by water flowing through the water passage. This reduces a possibility of an excessive temperature increase caused by accelerated $CO_2$ methanation reaction.

Embodiment 3

Hereinafter, the hydrogen purifier 100 according to Embodiment 3 is described.

Figure 4:
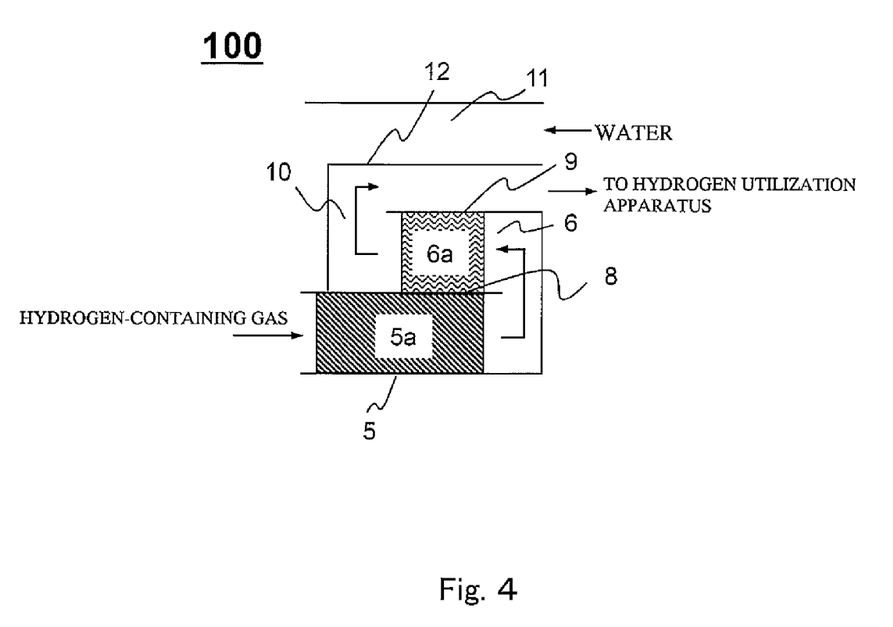
FIG. 4 shows a schematic configuration of a hydrogen purifier according to Embodiment 3.

FIG. 4 shows a schematic configuration of the hydrogen purifier according to the present embodiment.

As shown in FIG. 4, the hydrogen purifier 100 according to the present embodiment includes the water passage 11 and a gas passage 10 through which the hydrogen-containing gas that has passed through the methanation catalyst 6a flows. The hydrogen purifier 100 according to the present embodiment is configured in such a manner as to allow the hydrogen-containing gas flowing through the gas passage 10 to exchange heat, via a third partition wall 12, with the water flowing through the water passage 11. Moreover, the hydrogen purifier 100 according to the present embodiment is configured in such a manner as to allow the methanation catalyst 6a to exchange heat with the hydrogen-containing gas flowing through the gas passage 10 via the second partition wall 9, and to exchange heat with the water flowing through the water passage 11 via the gas passage 10. Other than the above, the hydrogen purifier 100 according to Embodiment 3 is the same as the hydrogen purifier 100 according to Embodiment 1. Therefore, a description regarding the other features of the hydrogen purifier 100 according to Embodiment 3 is omitted below. It should be noted that the above-described configuration according to the present embodiment may be applied to at least one of the hydrogen purifier 100 according to Variation 1 and the hydrogen purifier 100 according to Variation 2.

As described above, the hydrogen purifier 100 according to the present embodiment is configured in such a manner as to allow the methanation catalyst 6a to exchange heat in an indirect manner, via the gas passage 10, with the water flowing through the water passage 11. Therefore, a possibility that the temperature of the methanation catalyst drops excessively to deviate from a suitable temperature range for the methanation reaction is reduced as compared to the hydrogen purifier according to Embodiment 2.

Embodiment 4

Hereinafter, the hydrogen purifier 100 according to Embodiment 4 is described.

Figure 5:
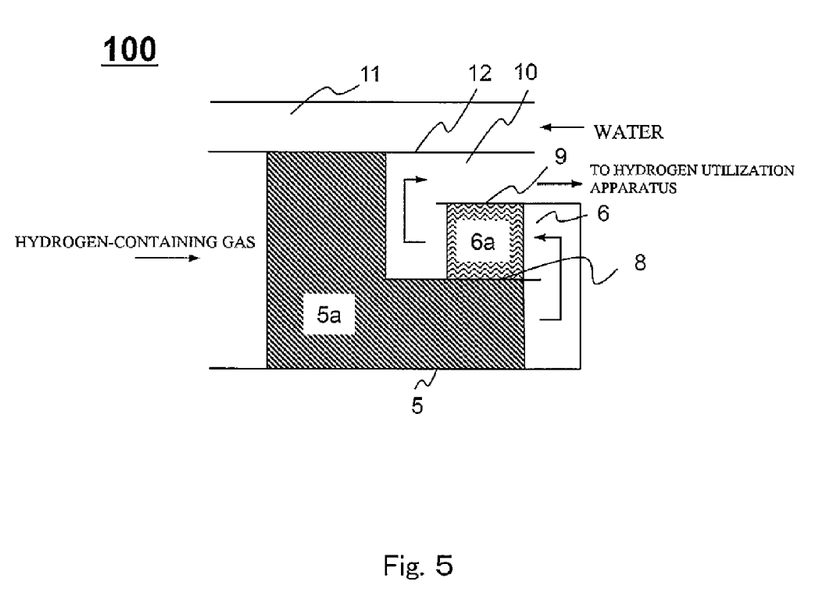
FIG. 5 shows a schematic configuration of a hydrogen purifier according to Embodiment 4.

FIG. 5 shows a schematic configuration of the hydrogen purifier 100 according to the present embodiment.

As shown in FIG. 5, the hydrogen purifier 100 according to the present embodiment is configured in such a manner as to allow the upstream side of the shift conversion catalyst 5a to exchange heat, via the third partition wall 12, with the water flowing thorough the water passage 11, and to allow the downstream side of the shift conversion catalyst 5a to exchange heat with the methanation catalyst 6a via the first partition wall 8.

According to the above configuration, an excessive temperature increase is suppressed at the upstream side of the shift conversion catalyst where a high temperature hydrogen-containing gas flows in, and also, a temperature gradient between the upstream and downstream sides of the methanation catalyst 6a is reduced. Moreover, a possibility that the temperature of the methanation catalyst 6a stays within a suitable temperature range is increased as compared to a case where the methanation catalyst exchanges heat with the upstream side of the shift conversion catalyst.

Furthermore, the hydrogen purifier 100 according to the present embodiment is configured in such a manner as to allow the upstream side of the shift conversion catalyst 5a to exchange heat with the water flowing through the water passage 11, the water having exchanged heat with the methanation catalyst 6a via the gas passage 10, and to allow the downstream of the shift conversion catalyst 5a to exchange heat with the methanation catalyst 6a via the first partition wall 8.

Generally speaking, suitable reaction temperatures for a shift conversion catalyst are higher than suitable reaction temperatures for a methanation catalyst. Here, assume a case where the flow direction of the water flowing through the water passage 11 is opposite to the water flow direction indicated in the above-described configuration. In this case, the water flowing through the water passage 11 exchanges heat with the upstream side of the shift conversion catalyst, and then exchanges heat with the methanation catalyst via the gas passage. This may result in that the temperatures of both of the shift conversion catalyst and the methanation catalyst deviate from their respective suitable temperature ranges. However, according to the above-described configuration, an effect of suppressing an excessive temperature increase at the upstream side of the shift conversion catalyst 5a and an effect of adjusting the temperature of the methanation catalyst 6a to a suitable temperature are advantageously exerted, and in addition, a possibility that the temperatures of both of the shift conversion catalyst and the methanation catalyst are maintained within their respective suitable temperature ranges is increased as compared to the case where the flow direction of the water flowing through the water passage 11 is opposite to the water flow direction indicated in the above-described configuration.

Other than the above, the hydrogen purifier 100 according to Embodiment 4 is the same as the hydrogen purifier 100 according to Embodiment 1. Therefore, a description regarding the other features of the hydrogen purifier 100 according to Embodiment 4 is omitted below.

It should be noted that the above-described configuration according to the present embodiment may be applied to at least one of the hydrogen purifier 100 according to Variation 1 and the hydrogen purifier 100 according to Variation 2.

Working Example

Next, a working example of the hydrogen purifier 100 according to the present embodiment is described.

Figure 6:
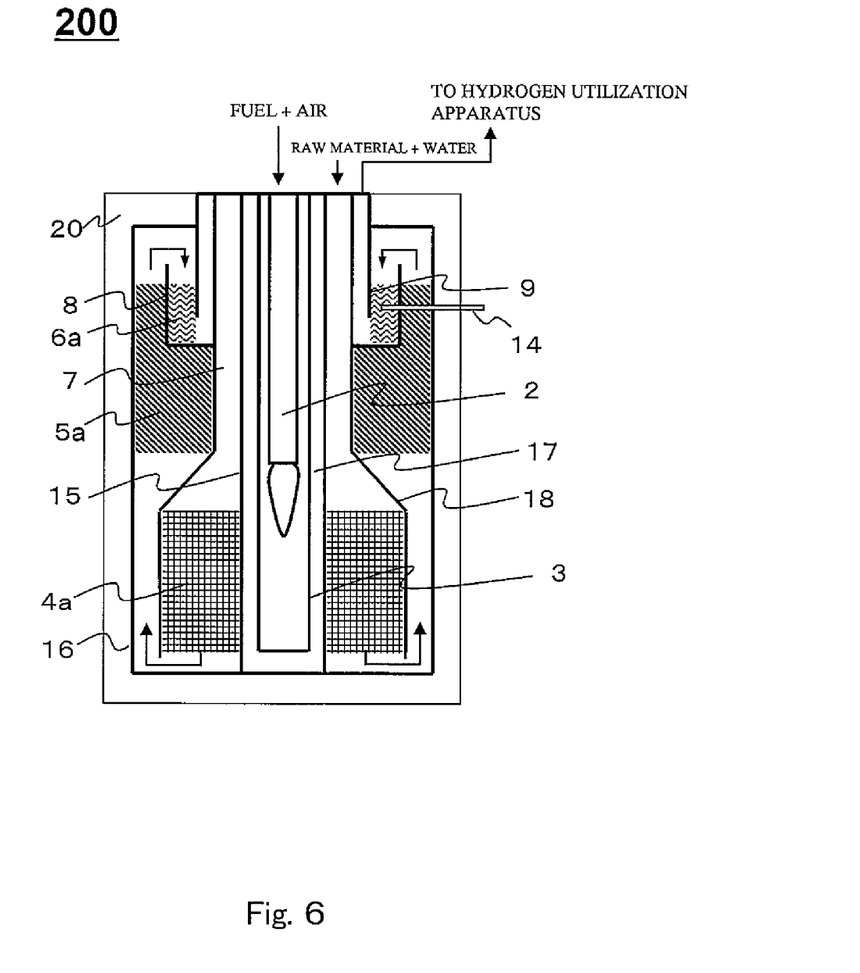
FIG. 6 shows a schematic configuration of a working example of the hydrogen purifier according to Embodiment 4.

FIG. 6 shows a schematic configuration of the hydrogen purifier 100 according to the working example of the present embodiment.

As shown in FIG. 6, a hydrogen generation apparatus 200 according to the working example includes a temperature detector 14, a reforming catalyst 4a, an evaporator 7, a burner 2, and a flue gas passage 17, in addition to the shift conversion catalyst 5a and the methanation catalyst 6a which form the hydrogen purifier 100.

The evaporator 7 is a component corresponding to the water passage 11.

The temperature detector 14 is a device configured to detect the temperature of the methanation catalyst 6a. For example, a thermocouple or a thermistor is used as the temperature detector 14. However, any device may be used as the temperature detector 14, so long as the device is configured to detect a temperature.

The reforming catalyst 4a is used for generating a hydrogen-containing gas through a reforming reaction between a raw material and steam, and is provided in annular space between a first cylinder 15 and a second cylinder 18 surrounding the outside of the first cylinder 15. Here, Ru, Ni, or the like may be used as a catalyst metal, for example. In the working example, Ni was used as a catalyst metal.

In the annular space between the first cylinder 15 and the second cylinder 18, the evaporator 7 is provided upstream from the reforming catalyst 4a. The evaporator 7 evaporates water supplied thereto. In the working example, a raw material is also supplied to the evaporator 7, and the raw material is preheated by the evaporator 7.

The burner 2 performs combustion by using a fuel and air supplied thereto. The flue gas passage 17 is a passage through which a flue gas generated by the burner 2 flows, and is formed by annular space between a combustion cylinder 3 and the first cylinder 15. The reforming catalyst 4a and the evaporator 7 are heated up in said order via the first cylinder 15 by the flue gas flowing through the flue gas passage 17.

A heat insulating material 20 covers the hydrogen generation apparatus 200. Specifically, the heat insulating material 20 is formed in such a manner as to cover a third cylinder 16 which is the outermost cylinder included in the hydrogen generation apparatus 200.

The shift conversion catalyst 5a included in the hydrogen purifier 100 is provided in annular space between the second cylinder 18 and the third cylinder 16. Also, the methanation catalyst 6a included in the hydrogen purifier 100 is provided in annular space positioned between the first partition wall 8 and the second partition wall 9. In the annular space between the second cylinder 18 and the third cylinder 16, the first partition wall 8 and the second partition wall 9 provided at the inside of the first partition wall 8 are disposed at the downstream side of the shift conversion catalyst 5a. Accordingly, heat is transferred from the shift conversion catalyst 5a to the methanation catalyst 6a via the first partition wall 8.

The hydrogen-containing gas that has passed through the shift conversion catalyst 5a turns its flow direction at a turn-around passage which is disposed downstream from the downstream end of the first partition wall 8, and then the hydrogen-containing gas flows into the methanation catalyst 6a. In this manner, the flow direction of the hydrogen-containing gas that passes through the shift conversion catalyst 5a and the flow direction of the hydrogen-containing gas that passes through the methanation catalyst 6a are made opposite to each other.

In the working example, a Cu—Zn based catalyst was used as the shift conversion catalyst 5a, and Ru was used as the methanation catalyst.

Although the working example includes no device dedicated for adjusting the temperature of the shift conversion catalyst 5a or the methanation catalyst 6a, a heating device using an electric heater or the like, or a cooling device using a cooling fan, radiator, or the like, may be used.

The hydrogen generation apparatus 200 with the above configuration was operated by using city gas (13A) as a raw material, with a steam/carbon ratio (S/C) set to 3. As a result, the temperature at the exit of the shift conversion catalyst 5a became 200° C., the temperature at the entrance of the methanation catalyst 6a became 220° C., and the temperature at the exit of the methanation catalyst 6a became 210° C. Also, the CO concentration in the hydrogen-containing gas at the exit of the methanation catalyst 6a became 27 ppm.

Here, the evaporator 7 serves as cooling means that cools down the upstream side of the shift conversion catalyst 5a via the second cylinder 18. However, a bypass passage, which extends from the evaporator 7, may be provided in such a manner as to allow the downstream side of the shift conversion catalyst 5a to be cooled down via the third cylinder 16.

The above configuration facilitates control of the temperature of the downstream portion of the shift conversion catalyst 5a.

The cooling means, which cools down the shift conversion catalyst 5a, is not limited to the evaporator 7, but may be configured in any manner so long as the cooling means is configured to cool down the shift conversion catalyst 5a. For example, the shift conversion catalyst 5a may be cooled down by using air supplied to the burner 2. Moreover, in a case where the hydrogen-containing gas from the hydrogen generation apparatus 200 is used for electric power generation by a fuel cell, the shift conversion catalyst 5a may be cooled down by using an oxidizing gas supplied to the fuel cell.

Comparative Example

Next, a comparative example is described in comparison with the above working example.

Figure 7:
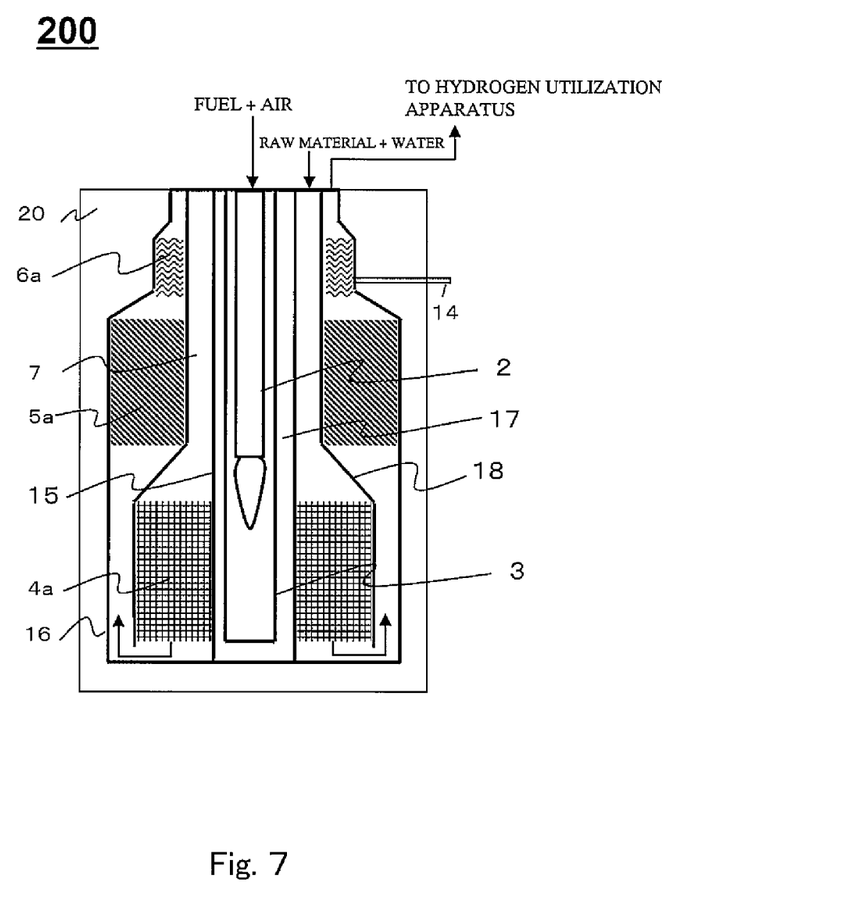
FIG. 7 shows a schematic configuration of a comparative example of a hydrogen purifier.

FIG. 7 shows a schematic configuration of the hydrogen purifier 100 according to the comparative example. In the comparative example, in the annular space between the second cylinder 18 and the third cylinder 16, the methanation catalyst 6a is provided downstream from the shift conversion catalyst 5a. Thus, unlike the hydrogen purifier 100 according to the above working example, the hydrogen purifier 100 according to the comparative example is not configured such that the methanation catalyst 6a receives heat transferred from the shift conversion catalyst 5a via a partition wall that is provided between the shift conversion catalyst 5a and the methanation catalyst 6a. Other than the above, the comparative example is the same as the working example. Therefore, a description regarding the other features of the comparative example is omitted below.

Here, similar to the working example, the hydrogen generation apparatus 200 was operated by using city gas (13A) as a raw material, with a steam/carbon ratio (S/C) set to 3. As a result, the temperature at the exit of the shift conversion catalyst 5a became 200° C., the temperature at the entrance of the methanation catalyst 6a became 200° C., and the temperature at the exit of the methanation catalyst 6a became 150° C. At the time, the CO concentration at the exit of the methanation catalyst became 420 ppm.

As described above, in the hydrogen purifier 100 according to the working example, the temperature gradient of the methanation catalyst 6a is 10° C. and temperatures of the entire methanation catalyst 6a stay within a suitable temperature range for CO reduction (200° C. to 240° C.). Accordingly, CO was reduced to 27 ppm through the methanation reaction.

On the other hand, in the hydrogen purifier 100 according to the comparative example, the temperature gradient of the methanation catalyst 6a is 50° C., which is greater than in the case of the hydrogen purifier 100 according to the working example, and the temperature of a part of the methanation catalyst 6a (specifically, the downstream side of the methanation catalyst 6a) deviates from the suitable temperature range for CO reduction (200° C. to 240° C.). Accordingly, CO was reduced to merely 420 ppm.

Embodiment 5

Hereinafter, the hydrogen purifier 100 according to Embodiment 5 is described.

Figure 8:
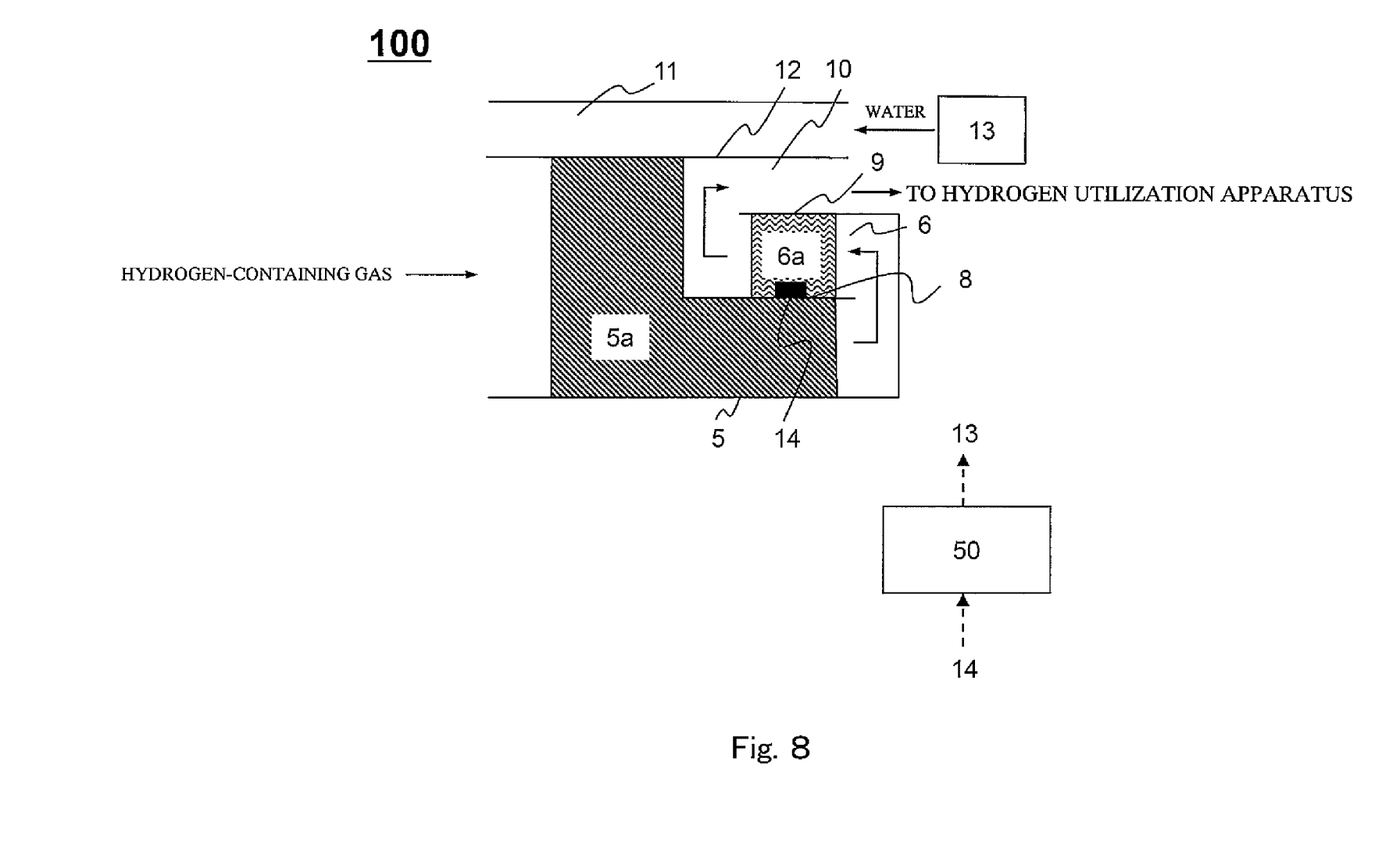
FIG. 8 shows a schematic configuration of a hydrogen purifier according to Embodiment 5.

FIG. 8 shows a schematic configuration of the hydrogen purifier 100 according to the present embodiment.

The hydrogen purifier 100 according to the present embodiment includes: the temperature detector 14; a water flow rate adjuster 13 configured to adjust the flow rate of water flowing through the water passage 11; and a controller 50 configured to control an operation amount of the water flow rate adjuster 13 based on a detection value of the temperature detector 14. If the water flow rate adjuster 13 is, for example, a water flow rate adjusting valve, then the controller 50 may control the degree of opening of the water flow rate adjusting valve based on a detection value of the temperature detector 14.

If the controller 50 performs control such that the detection value of the temperature detector 14 becomes a predetermined upper limit temperature or lower, then a risk of accelerated CO2 methanation reaction is reduced. Other than the above, the hydrogen purifier 100 according to Embodiment 5 is the same as the hydrogen purifier according to Embodiment 4. Therefore, a description regarding the other features of the hydrogen purifier 100 according to Embodiment 5 is omitted below.

The hydrogen purifier according to the present embodiment is configured such that the temperature detector 14, the water flow rate adjuster 13, and the controller 50 are applied to the hydrogen purifier according to Embodiment 4. However, as an alternative, the hydrogen purifier according to the present embodiment may be configured such that these devices are applied to the hydrogen purifier according to Embodiment 2 or the hydrogen purifier according to Embodiment 3.

Embodiment 6

Hereinafter, a fuel cell system according to Embodiment 6 is described.

Figure 9:
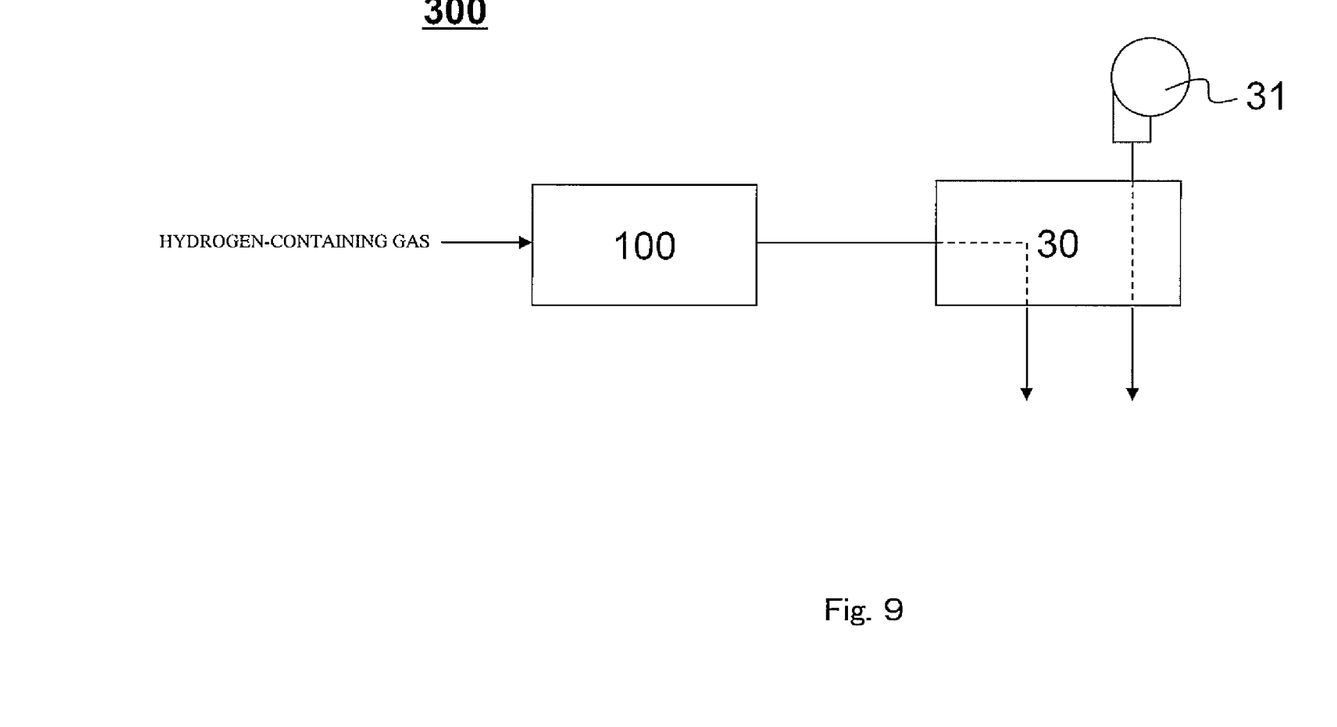
FIG. 9 shows a schematic configuration of a fuel cell system according to Embodiment 6.

FIG. 9 shows a schematic configuration of a fuel cell system 300 according to the present embodiment.

The fuel cell system according to the present embodiment includes: the hydrogen purifier according to any one of Embodiments 1 to 5; and a fuel cell configured to generate electric power by using the hydrogen-containing gas supplied from the hydrogen purifier.

Specifically, the fuel cell system 300 includes the hydrogen purifier 100, a fuel cell 30, and an oxidizing gas supply device 31. The fuel cell 30 generates electric power by using the hydrogen-containing gas supplied from the hydrogen purifier 100 and an oxidizing gas supplied from the oxidizing gas supply device 31. An air fan, air blower, or the like may be used as the oxidizing gas supply device 31.

Accordingly, the fuel cell system according the present embodiment is supplied with the hydrogen-containing gas, from which CO has been sufficiently reduced by the hydrogen purifier 100 through the methanation reaction. This allows the fuel cell system to generate electric power in a stable manner.

INDUSTRIAL APPLICABILITY

According to the hydrogen purifier and the fuel cell system of the present invention, the temperature gradient between the upstream and downstream sides of the methanation catalyst is reduced and CO methanation reactivity is improved as compared to conventional hydrogen purifiers and conventional fuel cell systems.

REFERENCE SIGNS LIST 2 burner
3 combustion cylinder
4a reforming catalyst
5 shift converter
5a shift conversion catalyst
6 CO remover
6a methanation catalyst
7 evaporator
8 first partition wall
9 second partition wall
10 gas passage
11 water passage
12 third partition wall
13 water flow rate adjuster
14 temperature detector
15 first cylinder
16 third cylinder
17 flue gas passage
18 second cylinder
20 heat insulating material
30 fuel cell
31 oxidizing gas supply device
50 controller
100 hydrogen purifier
200 hydrogen generation apparatus
300 fuel cell system

The invention claimed is:
1. A hydrogen purifier comprising:
a shift conversion catalyst which is disposed on an upstream gas passage of the hydrogen purifier and includes at least one selected from the group of consisting of Pt and Cu—Zn based catalyst, and reduces, through a shift reaction, an amount of carbon monoxide contained in a hydrogen-containing gas;

a methanation catalyst which is disposed on a portion of the upstream gas passage downstream of the shift conversion catalyst and includes at least one selected from the group of consisting of Ru, Rh and Ni, and reduces, through a methanation reaction, an amount of carbon monoxide contained in the hydrogen-containing gas that has passed through the shift conversion catalyst;

a water passage; and a downstream gas passage which is disposed downstream of the upstream gas passage and through which the hydrogen-containing gas that has passed through the methanation catalyst flows, wherein:

the shift conversion catalyst and the methanation catalyst are heat exchangeable with each other through a first partition wall, the upstream gas passage is bent such that a first flow direction of the hydrogen-containing gas that passes through the shift conversion catalyst is opposite to a second flow direction of the hydrogen-containing gas that passes through the methanation catalyst, the hydrogen-containing gas flowing through the downstream gas passage is heat exchangeable, through a third partition wall, with water flowing through the water passage, the methanation catalyst is heat exchangeable with the downstream gas passage through a second partition wall and heat exchangeable, through the downstream gas passage, with the water flowing through the water passage, the second partition wall being disposed between the methanation catalyst and the downstream gas passage, and along a line cutting the shift conversion catalyst, the first partition wall, the methanation catalyst, the second partition wall, the gas passage, the third partition wall, and the water passage in a cross section of the hydrogen purifier, the shift conversion catalyst, the first partition wall, the methanation catalyst, the second partition wall, the downstream gas passage, the third partition wall, and the water passage are arranged in this order, the line being perpendicular to the first and second partition walls.

2. The hydrogen purifier according to claim 1, wherein:

an upstream side of the shift conversion catalyst is heat exchangeable, through the third partition wall without the downstream gas passage, with the water flowing through the water passage, and a downstream side of the shift conversion catalyst is heat exchangeable with the methanation catalyst through the first partition wall.

3. The hydrogen purifier according to any one of claims 1 and 2, wherein the methanation catalyst is heat exchangeable with an upstream side of the water passage.

4. The hydrogen purifier according to any one of claims 1 and 2, comprising:

a water flow rate adjuster configured to adjust a flow rate of the water within the water passage; and a controller configured to control an operation amount of the water flow rate adjuster in accordance with a temperature of the methanation catalyst.

5. A fuel cell system comprising:

the hydrogen purifier according to claim 1; and a fuel cell configured to generate electric power by using the hydrogen-containing gas that is supplied from the hydrogen purifier.

6. The hydrogen purifier according to claim 1, wherein the upstream gas passage and the downstream gas passage is connected by a bent portion such that a third flow direction of the hydrogen-containing gas that passes through the downstream gas passage is opposite to the second flow direction of the hydrogen-containing gas.

7. The hydrogen purifier according to claim 6, wherein a forth flow direction of the water that passes through the water passage is opposite to the third flow direction of the hydrogen containing-gas.

* * * * *